(No Model.)
C. W. ROGERS.
HYGROMETRIC VALVE CONTROLLER.
No. 483,725. Patented Oct. 4, 1892.
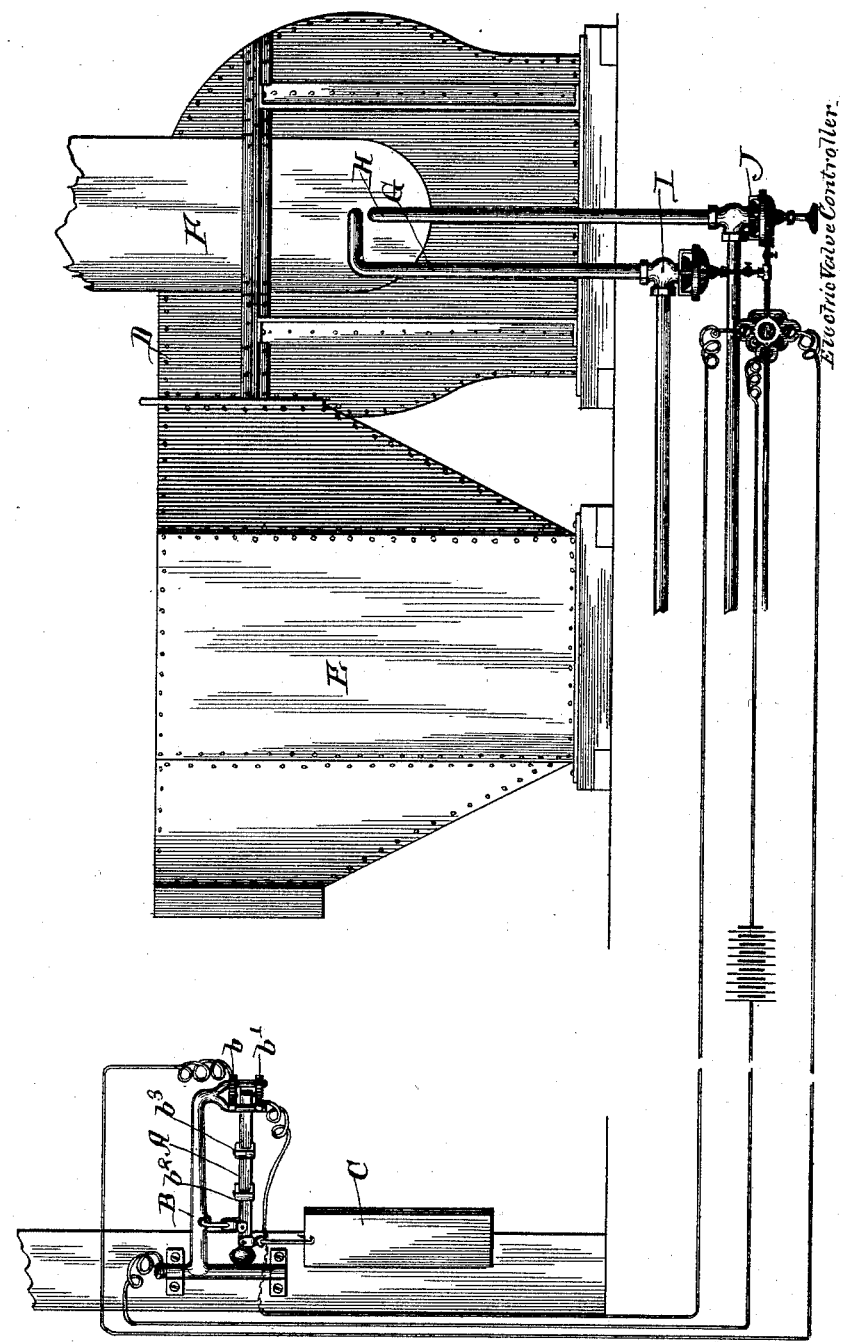
Witnesses.
Charles O. Hervey.
Gerald Mahony
Inventor:
Charles W. Rogers.
By Niles, Frue & Bitner
Attys.

UNITED STATES PATENT OFFICE.

CHARLES W. ROGERS, OF CHICAGO, ILLINOIS.

HYGROMETRIC VALVE-CONTROLLER.

SPECIFICATION forming part of Letters Patent No. 483,725, dated October 4, 1892.

Application filed December 24, 1891. Serial No. 416,089. (No model.)

*To all whom it may concern:*

Be it known that I, CHARLES W. ROGERS, a citizen of the United States of America, residing at Chicago, in the county of Cook and State of Illinois, have invented certain new and useful Improvements in Hygrometers, of which the following is a specification.

My invention relates, first, to a new and improved device for measuring the humidity of the atmosphere and indicating the percentage of moisture contained at any given moment, and, second, to a combination, with such an instrument, of certain other devices making up a system adapted to automatically regulate the humidity of air within any inclosed space.

In a great many manufacturing establishments—as, for instance, cotton and woolen mills and similar places—it is absolutely essential that, to insure the greatest efficiency of which the plant is capable, the degree of moisture of the air within the factory be kept even and at a certain predetermined point.

My improvements have been made with especial thought of their application to such establishments. There are, however, certain portions of them which have a much wider application. Hence I do not confine myself to any combination or combinations of the devices shown and described, except as clearly pointed out in the claims appended to this specification.

My invention is illustrated in the drawings presented herewith by means of a single figure, showing at the left a perspective of the hygrometer proper and at the right a suitable means of moistening the air which is to be used.

Describing first the former, it is shown as consisting of an ordinary scale-beam A, fulcrumed upon an overhanging arm B, supported upon the inner walls of the apartment and having at its free end stops $b\ b'$ to limit the swinging of the scale-beam. Upon the end of the latter, which usually carries the weight, a body C, preferably of considerable size and of a nature adapted to readily absorb moisture from the atmosphere and also to evaporate the same under proper conditions, is hung. The scale-beam is provided with sliding weights $b^2\ b^3$ in the same manner as the ordinary scales, and the humidity of the air is ascertained by actually weighing the moisture absorbed by the body C. The beam is preferably graduated to show the percentage of moisture, so that the same can be learned at a glance. The body C may be composed of any suitable material, the best I have so far discovered being common clay. This may be prepared by pulverizing it, the small gravel and other hard substances having been first removed, then mixing it to form a paste, and then applying it to a porous cloth, which may be folded upon itself to form a complete inclosure and protect the clay from loss in the form of dust blown from the surface.

While the above device is complete and perfect as far as the indication of the humidity of the air to the eye is concerned, and might be used with more or less satisfaction in establishments already provided with hand-operated devices for discharging moisture into the air, yet I have for the purpose of producing an apparatus which shall be wholly automatic combined it with a device adapted to moisten the air in such a way that the scale-beam itself automatically actuates the moistening device whenever the humidity of the air falls below the desired point and again checks it when the humidity rises above that point. For this purpose I provide a pipe or series of pipes connected with a supply of steam or water, as may be desired, and having at the point or points where they discharge into the air suitable spraying devices, and in these pipes I interpose automatic valves provided with suitable operating devices connected with the scale-beam.

The most convenient way of moistening the air in the room is to discharge moisture, either in the form of steam or a finely-divided spray of water, into the air which is forced into such room for the purpose of ventilation or heating.

In the drawings I have illustrated my complete apparatus in connection with a fan D and a heating-chamber E, through which air may be supplied to an apartment or apartments at whatever temperature may be desired. The fan D draws air through a supply-pipe F, and discharging into this pipe I have shown two small pipes G H, one of which may be used to carry steam and the other to carry water. In these pipes are interposed automatic valves I and J, actuated through well-known devices by electric currents made and broken by the movements of the scale-beam. It is not thought necessary to describe in detail the particular devices for operating the valves, inasmuch as they are well-known and widely used. The arm B, which supports the scale-beam, has the blocks $b$ $b'$, which limit the movements of the latter, insulated from it, and suitable contact-points are provided upon these blocks and upon the scale-beam, so that when the free arm of the beam rises one circuit will be completed through the block $b$, and when said beam falls the first circuit will be broken and another made through the block $b'$. The pipes G H are shown here as discharging directly into the ventilating-fan. This of course is adapted only to buildings composed of one apartment or of a number of apartments, all of which are to be kept at the same degree of humidity. In all other cases a separate hygrometer will be required for each apartment and will be connected with a valve interposed in the branch pipe leading to such apartment.

I claim as new and desire to secure by Letters Patent—

1. In a hygrometer, and in combination with a suitable weighing device, a body supported therefrom and composed of clay provided with a suitable cover to prevent it from loss, substantially as described.

2. The combination, with a measuring device adapted to be operated by changes in humidity of the atmosphere, of suitable air-moistening devices provided with valves and suitable connecting devices through which said valves may be operated by the measuring device, substantially as described.

3. The combination, with a body adapted to readily take up moisture from the air or to give up the same thereto under proper conditions, of a weighing device supporting said body upon its weight end, a series of electric circuits adapted to be made and broken by the movements of said weighing device, a moistening device provided with a valve, and means for automatically operating said valve by the making and breaking of the electric circuits.

CHARLES W. ROGERS.

Witnesses:
CHARLES O. SHERVEY,
GERALD MAHONY.